US010286563B2

(12) United States Patent
Yamazaki et al.

(10) Patent No.: US 10,286,563 B2
(45) Date of Patent: May 14, 2019

(54) ROBOT SYSTEM AND CABLE (71) Applicant: Seiko Epson Corporation, Tokyo (JP)

(72) Inventors: Takema Yamazaki, Fujimi (JP); Takashi Kojima, Matsumoto (JP)

(73) Assignee: Seiko Epson Corporation (JP)

( * ) Notice: Subject to any disclaimer, the term of this patent is extended or adjusted under 35 U.S.C. 154(b) by 2 days.

(21) Appl. No.: 15/201,924

(22) Filed: Jul. 5, 2016

(65) Prior Publication Data
US 2017/0015008 A1 Jan. 19, 2017

(30) Foreign Application Priority Data

Jul. 17, 2015 (JP) ................... 2015-142718

(51) Int. Cl.
B25J 19/00 (2006.01)
H01B 9/00 (2006.01)
H01B 9/02 (2006.01)

(52) U.S. Cl.
CPC ................... B25J 19/0025 (2013.01)

(58) Field of Classification Search
CPC ....... G01R 33/02; G02B 6/4401; H03H 5/003
USPC ........ 174/115, 70 R, 71 R, 72 R, 72 B, 72 C
See application file for complete search history.

(56) References Cited

U.S. PATENT DOCUMENTS

| 8,247,695 | B2 | 8/2012 | Nakamura et al. | |
| 9,620,262 | B1* | 4/2017 | Salz | H01B 7/0892 |
| 2004/0261563 | A1* | 12/2004 | Inoue | B25J 19/0025 74/490.03 |
| 2006/0137894 | A1* | 6/2006 | Cusson | H01B 7/20 174/105 R |
| 2007/0107921 | A1* | 5/2007 | Morrison | H01B 9/02 174/36 |
| 2011/0162866 | A1* | 7/2011 | Masakazu | H01B 11/002 174/103 |
| 2012/0126804 | A1* | 5/2012 | White | G01R 33/072 324/244 |
| 2013/0039730 | A1* | 2/2013 | Sueyoshi | B25J 9/042 414/685 |
| 2014/0263289 | A1* | 9/2014 | Mosebach | E21B 43/2401 219/672 |
| 2015/0096785 | A1* | 4/2015 | Hayashishita | H01B 3/445 174/113 R |

FOREIGN PATENT DOCUMENTS

| JP | 2005-267873 A | 9/2005 |
| JP | 2014-212127 A | 11/2014 |
| WO | WO-2008-041708 A1 | 4/2008 |

* cited by examiner

Primary Examiner — Timothy J Thompson
Assistant Examiner — Charles Pizzuto
(74) Attorney, Agent, or Firm — Harness, Dickey & Pierce, P.L.C.

(57) ABSTRACT

A robot system includes a plurality of drive parts, a control unit that controls power for driving the drive parts by switching, and a cable that connects the drive parts and the control unit, wherein the cable has a plurality of power lines, a plurality of frame ground lines, and a shield, a first interposition object is provided between the plurality of power lines and the shield, and, in a section of the cable, respective centers of the plurality of frame ground lines are closer to the shield than respective centers of the plurality of power lines.

11 Claims, 5 Drawing Sheets

FIG. 1

-  POWER LINE
-  FG LINE
-  OTHER LINE (ADDITIONAL LINE)
-  DRAIN WIRE

| MATERIAL | AIR | POLY-ETHYLENE | FOAMED POLY-ETHYLENE | VINYL CHLORIDE | POLY-PROPYLENE | POLY-TETRAFLUORO-ETHYLENE | POLYESTER |
|---|---|---|---|---|---|---|---|
| RELATIVE PERMITTIVITY | 1 | 2.2 - 2.4 | 1.6 - 2.0 | 5 - 8 | 2.2 - 2.3 | 2.0 - 2.2 | 3 - 4 |

FIG. 6

111
ROBOT SYSTEM AND CABLE

BACKGROUND

1. Technical Field

The present invention relates to a robot system and a cable.

2. Related Art

In a robot system, a control unit and a robot are connected via a cable and the control unit controls the robot via the cable. As the cable, for example, a motor drive cable is used.

Regarding the motor drive cable, development has been conducted (see Patent Document 1 (JP-A-2005-267873) and Patent Document 2 (International Publication No. 2008/041708)).

The motor drive cable has a power line and a frame ground (FG line). A conductive noise current flows via capacitance parasitic between the power line and the FG. The current is specifically a common-mode switching noise current. A mechanism of generating conductive noise by switching for driving motor is described in, for example, Patent Document 1 (see Patent Document 1). Normally, parasitic capacitance increases in proportion to the length of the cable.

Patent Document 1 discloses that, when a motor is driven using a power converter, in a power cable of supplying power from a power source to the power converter or from the power converter to the motor, respectively insulated power lines of respective phases are bundled together and an insulator containing a core member of a magnetic material covers around the power lines (see Patent Document 1). However, the technology disclosed in Patent Document 1 is insufficient as measures for conductive common-mode noise in the motor drive cable that drives a plurality of motors.

Patent Document 2 discloses a motor drive cable with a high frequency leak current return wire in which the inductance of a high frequency leak current return wire is reduced by arranging an insulated core wire for driving consisting of a plurality of lines in close proximity to and adjacent to a high frequency leak current return wire consisting of one to a plurality of lines, and, at the same time, the insulated core wires for driving and the high frequency leak current return wires are arranged substantially in parallel in the length direction and stranded before a sheath is applied to the outside of the stranded wires with no intervention of a shield (see Patent Document 2). However, in the technology disclosed in Patent Document 2, focus is mainly placed on the inductance parasitic in the cable, and the technology addresses the noise (radioactive noise) with a higher frequency than that of the conductive noise and is insufficient for the conductive noise.

SUMMARY

An aspect of the invention is directed to a robot system including a plurality of drive parts, a control unit that controls power for driving the drive parts by switching, and a cable that connects the drive parts and the control unit, wherein the cable has a plurality of power lines, a plurality of frame ground lines, and a shield, a first interposition object is provided between the plurality of power lines and the shield, and, in a section of the cable, respective centers of the plurality of frame ground lines are closer to the shield than respective centers of the plurality of power lines.

According to this configuration, in the robot system, in the cable connecting the drive parts and the control unit, the first interposition object is provided between the plurality of power lines and the shield, and, in the section of the cable, the respective centers of the plurality of frame ground lines are closer to the shield than the respective centers of the plurality of power lines. Thereby, in the robot system, in the cable, a conductive noise current may be reduced by the power lines, the frame ground lines, the shield, and the first interposition object.

The aspect of the invention may be configured such that, the robot system, includes a second interposition object between the plurality of power lines and the plurality of frame ground lines.

According to this configuration, in the robot system, in the cable, the second interposition object is provided between the plurality of power lines and the plurality of frame ground lines. Thereby, the conductive noise current may be reduced by the second interposition object.

The aspect of the invention may be configured such that, in the robot system, at least one of the first interposition object and the second interposition object is an insulator.

According to this configuration, in the robot system, in the cable, at least one of the first interposition object and the second interposition object is an insulator. Thereby, the conductive noise current may be reduced by the insulator.

The aspect of the invention may be configured such that, in the robot system, the power line includes a conductor wire and an insulator.

According to this configuration, in the robot system, in the cable, the power line includes a conductor wire and an insulator. Thereby, in the robot system, in the cable, when the power line including a conductor wire and an insulator is used, the conductive noise current may be reduced.

The aspect of the invention may be configured such that, in the robot system, the frame ground line includes a conductor wire and an insulator, and a thickness of the insulator of the frame ground line is thinner than a thickness of the insulator of the power line.

According to this configuration, in the robot system, in the cable, the frame ground line includes a conductor wire and an insulator, and the thickness of the insulator of the frame ground line is thinner than the thickness of the insulator of the power line. Thereby, in the robot system, in the cable, when the frame ground line including a conductor wire and an insulator is used, the thickness of the insulator of the frame ground line is thinner than the thickness of the insulator of the power line and, for example, there may be a space for increasing the thickness of the first interposition object, and the conductive noise current may be reduced.

The aspect of the invention may be configured such that, in the robot system, the insulator is at least one of air, cotton, or plastic.

According to this configuration, in the robot system, in the cable, the insulator is at least one of air, cotton, or plastic. Thereby, in the robot system, in the cable, the conductive noise current may be reduced by the insulator.

The aspect of the invention may be configured such that, in the robot system, least one of the first interposition object and the second interposition object is another wire rod than the power lines and the frame ground lines.

According to this configuration, in the robot system, in the cable, at least one of the first interposition object and the second interposition object is another wire rod than the power lines and the frame ground lines. Thereby, in the robot system, in the cable, the conductive noise current may be reduced by the interposition object.

The aspect of the invention may be configured such that, in the robot system, the plurality of power lines take a form of a bundle, and the bundle has a circular shape in the section of the cable.

According to this configuration, in the robot system, in the cable, the plurality of power lines take the form of a bundle, and the bundle has a circular shape in the section of the cable. Thereby, in the robot system, in the cable, the conductive noise current may be reduced by the bundle of the plurality of power lines.

The aspect of the invention may be configured such that, in the robot system, the frame ground lines are not sandwiched between the respective plurality of power lines.

According to this configuration, in the robot system, in the cable, the frame ground lines are not sandwiched between the respective plurality of power lines. Thereby, in the robot system, in the cable, the frame ground lines are not sandwiched between the respective plurality of power lines, and the conductive noise current may be reduced.

The aspect of the invention may be configured such that, in the robot system, a diameter of the frame ground line is thicker than a diameter of another wire rod than the frame ground line.

According to this configuration, in the robot system, in the cable, the diameter of the frame ground line is thicker than the diameter of another wire rod than the frame ground line. Thereby, in the robot system, in the cable, the diameter of the frame ground line is thicker and, for example, the distance between the power lines and the shield can be increased, and the conductive noise current may be reduced.

The aspect of the invention may be configured such that, in the robot system, the frame ground lines are arranged at equal intervals.

According to this configuration, in the robot system, in the cable, the frame ground lines are arranged at equal intervals. Thereby, in the robot system, in the cable, the section can be made to be circular (or nearly circular), and application of bending stress can be prevented from depending on the bending direction.

The aspect of the invention may be configured such that, in the robot system, the shield is formed only by a conductor braided tube.

According to this configuration, in the robot system, in the cable, the shield is formed only by the conductor braided tube. Thereby, in the robot system, in the cable, the conductive noise current may be reduced by the shield.

Another aspect of the invention is directed to a cable including a plurality of power lines, a plurality of frame ground lines, a shield, and a first interposition object between the plurality of power lines and the shield, wherein, in a section of the cable, respective centers of the plurality of frame ground lines are closer to the shield than respective centers of the plurality of power lines.

According to this configuration, in the cable, the first interposition object is provided between the plurality of power lines and the shield, and, in the section of the cable, the respective centers of the plurality of frame ground lines are closer to the shield than the respective centers of the plurality of power lines. Thereby, in the cable, a conductive noise current may be reduced by the power lines, the frame ground lines, the shield, and the first interposition object.

As described above, according to the robot system and the cable of the aspects of the invention, in the cable, the first interposition object is provided between the plurality of power lines and the shield, and, in the section of the cable, the respective centers of the plurality of frame ground lines are closer to the shield than the respective centers of the plurality of power lines. Thereby, in the robot system and the cable according to the aspects of the invention, in the cable, the conductive noise current may be reduced by the power lines, the frame ground lines, the shield, and the first interposition object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be explained in detail with reference to the drawings.

First Embodiment

Outline of Robot System

Figure 1:
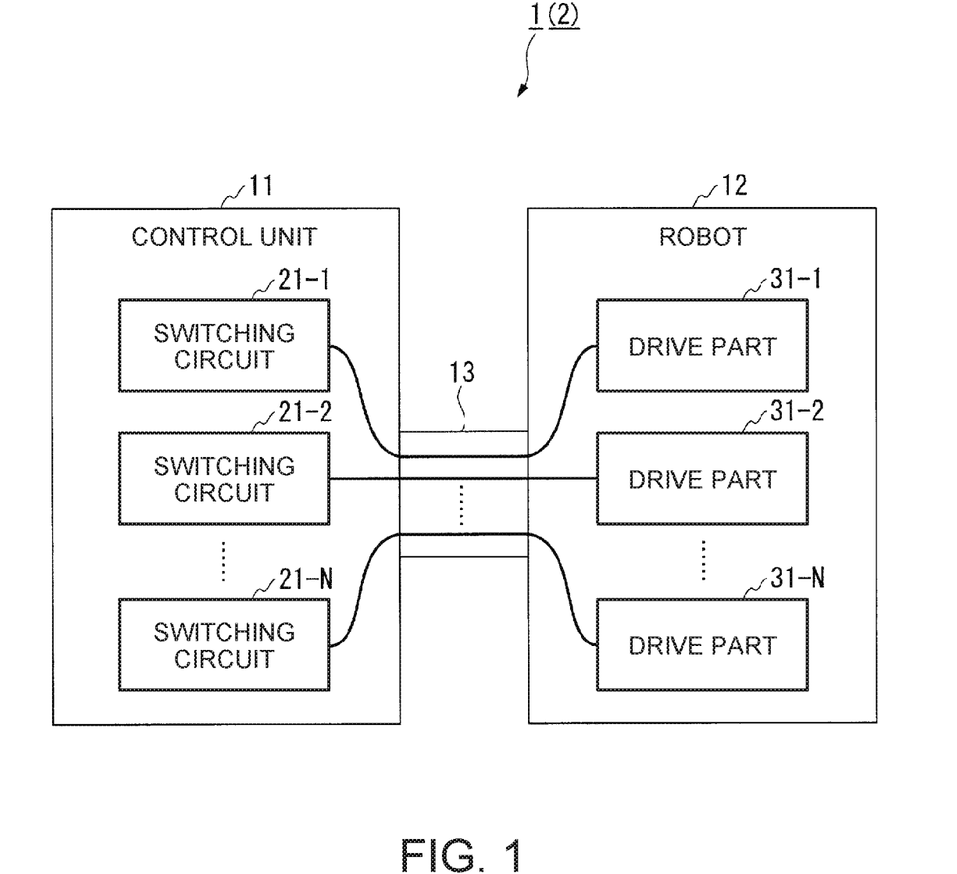
FIG. 1 shows a schematic configuration example of a robot system according to one embodiment of the invention.

FIG. 1 shows a schematic configuration example of a robot system 1 according to one embodiment of the invention.

The robot system 1 includes a control unit 11, a robot 12, and a cable 13.

The control unit 11 includes N (N is an integer equal to or more than one) switching circuits 21-1 to 21-N.

The robot 12 includes N drive parts 31-1 to 31-N.

The N switching circuits 21-1 to 21-N of the control unit 11 and the N drive parts 31-1 to 31-N of the robot 12 correspond one-to-one, respectively. Each of the N switching circuits 21-1 to 21-N of the control unit 11 and each of the N drive parts 31-1 to 31-N of the robot 12 are connected via the cable 13. The cable 13 has a plurality of lines that connect the switching circuits 21-1 to 21-N and the drive parts 31-1 to 31-N to each other with respect to each combination thereof. Note that, in FIG. 1, the detailed configuration of the cable 13 is omitted and outlined.

The control unit 11 controls the robot 12. In the embodiment, control of transmitting power for driving from the switching circuits 21-1 to 21-N of the control unit 11 to the drive parts 31-1 to 31-N of the robot 12 via the cable 13 will be explained in detail.

Note that the control unit 11 performs other various kinds of control on the motion of the robot 12 than the control of transmitting power, but, in the embodiment, their detailed explanation will be omitted or simplified. As an example, the control unit 11 communicates signals containing various kinds of information with the robot 12. A cable for communication of the signals is separately provided from e.g. the cable 13 for transmitting the power. For example, compared to the cable for communication of the signals, a larger voltage is applied to the cable 13 for transmitting the power.

In the embodiment, the control unit 11 is separately provided from the robot 12, however, the control unit 11 may be integrated and built in the robot 12 as another configuration example and, in this case, for example, the robot 12 includes the control unit 11 and the cable 13.

The robot 12 may be various robots. The robot may be a single arm robot having a single arm or a dual-arm robot having two arms. Or, the robot 12 may be, e.g. a parallel link robot, an orthogonal axis robot, a single-axis robot, or a scalar robot.

The number (N) of combinations of the switching circuits 21-1 to 21-N and the drive parts 31-1 to 31-N may be various numbers. In the embodiment, the robot 12 is an articulated robot having six axes, i.e., N=6, and performs motions about the respective axes using the respective drive parts 31-1 to 31-N.

The respective switching circuits 21-1 to 21-N are circuits for switching and, in the embodiment, inverters.

The respective drive parts 31-1 to 31-N are component parts for driving and, in the embodiment, motors.

Here, in the embodiment, the case where the cable 13 is used for the control of the robot 12 is shown, however, the invention may be applied to the case where a cable is used for control of an IC handler or the like as another configuration example. For example, the invention may be applied to a system that drives a plurality of motors.

A program for realizing an arbitrary function in the control unit 11 may be recorded (stored) in a computer-readable recording medium (memory medium) and the program may be read into a computer system and executed. Note that "computer system" here includes an operating system (OS) or hardware such as a peripheral. Further, "computer-readable recording medium" refers to a portable medium such as a flexible disk, a magnetooptical disk, a ROM (Read Only Memory), a CD (Compact Disk)-ROM or a storage device such as a hard disk built in the computer system. Furthermore, "computer-readable recording medium" includes a medium that holds a program in a fixed period such as a volatile memory (RAM: Random Access Memory) within the computer system serving as a server or client when the program is transmitted via a network such as the Internet or a communication line such as a phone line.

The program may be transmitted from the computer system in which the program is stored in a memory device or the like via a transmission medium or transmission wave within the transmission medium to another computer system. Here, "transmission medium" for transmission of the program refers to a medium having a function of transmitting information including a network (communication network) such as the Internet or a communication line such as a phone line.

Further, the program may realize part of the above described functions. Furthermore, the program may realize the above described functions in combination with a program that has been already recorded in the computer system, the so-called differential file (differential program).

Explanation of Cable

Figure 2:
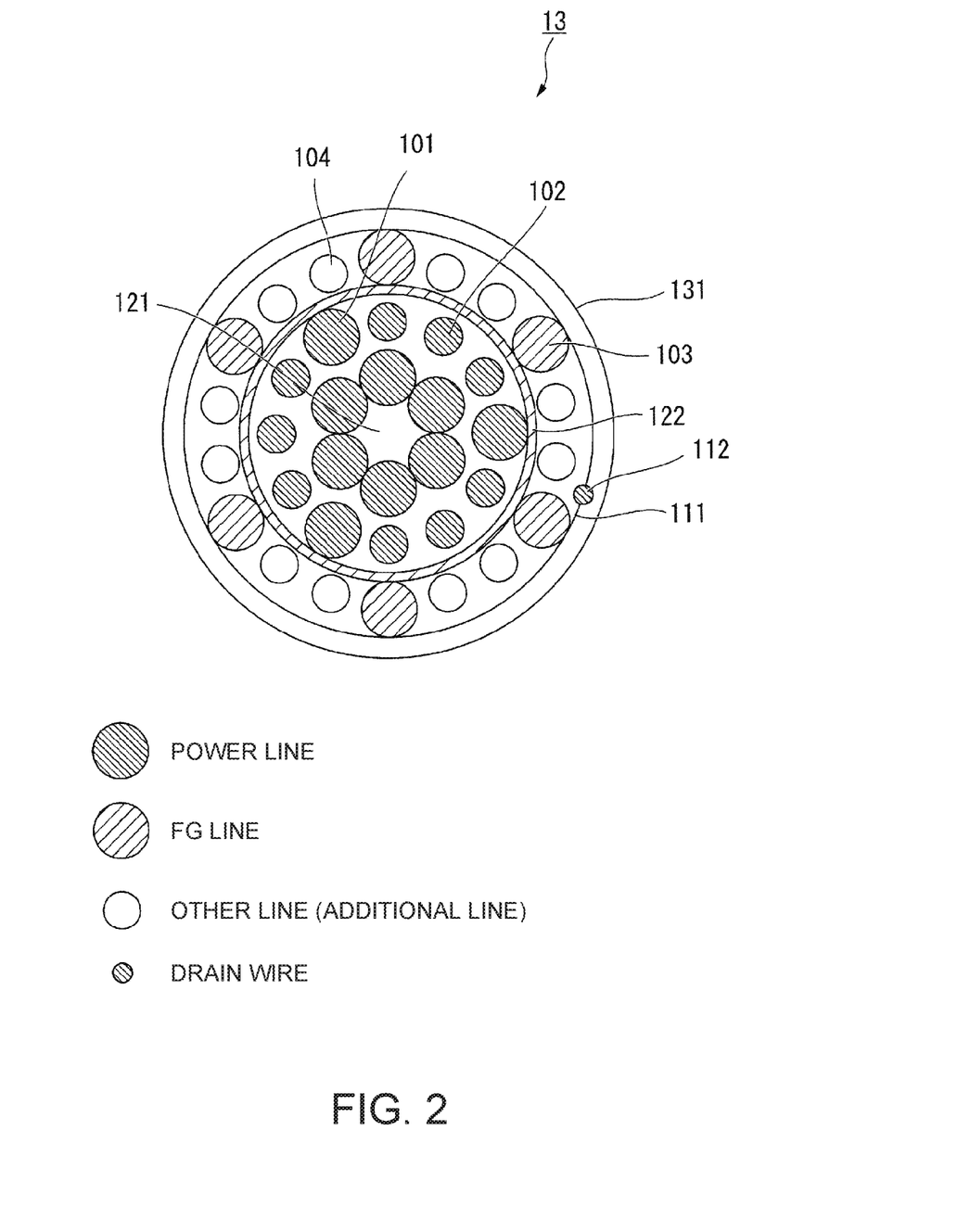
FIG. 2 shows a schematic configuration example of a cable according to one embodiment (the first embodiment) of the invention.

FIG. 2 shows a schematic configuration example of the cable 13 according to one embodiment (the first embodiment) of the invention.

FIG. 2 shows the configuration example of the section of the cable 13. The section is a section perpendicular to the center line of the cable 13.

The section of the cable 13 has a circular shape.

The outside of the cable 13 is covered by a sheath 131. The sheath 131 is formed using e.g. rubber or vinyl chloride.

Inside of the cable 13, a plurality of thick power lines 101, a plurality of thin power lines 102, a plurality of frame ground lines (FG lines) 103, a plurality of other lines (hereinafter, referred to as "additional lines" for convenience of explanation) 104, a shield 111, a drain wire (drain line) 112, an inclusion 121, and an interposition layer 122 are provided.

Note that, in FIG. 2, signs show only one of each of the thick power lines 101, the thin power lines 102, the FG lines 103, and the additional lines 104.

In the embodiment, there are nine thick power lines 101 and nine thin power lines 102. The switching circuits 21-1 to 21-N and the drive parts 31-1 to 31-N are connected with respect to each combination using three thick power lines 101 or three thin power lines 102. In the embodiment, of the six drive parts 31-1 to 31-N (N=6), the thick power lines 101 are used for the three axes at the root of the manipulator forming the robot 12 and the thin power lines 102 are used for the three axes at the end of the manipulator. The thick power lines 101 can transmit higher power (e.g. higher current or higher voltage) than the thin power lines 102. In the embodiment, operation of a three-phase motor is performed by three power lines (U, V, W).

Note that, in the embodiment, the three-phase motor is used, however, as another configuration example, a two-phase motor or a single-phase motor may be used. Or, as the motor, e.g. a stepping motor may be used.

In the embodiment, there are six FG lines 103. One FG line 103 is used for each of the six drive parts 31-1 to 31-N (N=6). Each FG line 103 is connected to a chassis of each of the drive parts 31-1 to 31-N (a chassis of each motor in the embodiment), and a chassis of the robot 12. Further, the FG lines 103 are connected to the ground at the sides of the switching circuits 21-1 to 21-N.

As another configuration example, a configuration in which the FG lines 103 are connected to the ground at the sides of the drive parts 31-1 to 31-N in place of the sides of the switching circuits 21-1 to 21-N.

In the embodiment, there are twelve additional lines 104. In the embodiment, two additional lines 104 are used for each of the six drive parts 31-1 to 31-N (N=6).

The additional lines 104 may be various lines. For example, lines for transmitting predetermined currents or dummy lines may be used.

As described above, in the embodiment, three power lines (three thick power lines 101 or three thin power lines 102), one FG line 103, and the two additional lines 104 are used for connection of each of the combinations of the switching circuits 21-1 to 21-N and the drive parts 31-1 to 31-N. The configuration is an example, and another configuration may be used.

In the section of the cable 13, the inclusion 121 is provided in the center part of the circular shape. The six thick power lines 101 are symmetrically arranged around the inclusion. The three thick power lines 101 are symmetrically arranged and the nine thin power lines 102 are symmetrically arranged around the six thick power lines. The cylindrical interposition layer 122 (having a circular section) is provided around the power lines. The six FG lines 103 are symmetrically arranged and the twelve additional lines 104 are symmetrically arranged around the layer. The cylindrical shield 111 (having a circular section) is provided around the lines. The cylindrical sheath 131 (having a circular section) is provided around the shield. The drain wire 112 is provided in the shield 111.

Here, the inclusion 121 at the center has a role of arranging the shape of the cable 13.

Further, inside of the sheath 131, air exists in parts without the inclusion 121, the power lines 101, 102, the interposition layer 122, the FG lines 103, the additional lines 104, the shield 111, and the drain wire 112. As another configuration example, another material than air may be provided in a part or all of the parts in which the air exists.

In parts in which the three thick power lines 101 and the nine thin power lines 102 are arranged around the six thick power lines 101, the nine thin power lines 102 can be separated from the shield 111 compared to the three thick power lines 101.

Regarding the cable 13 according to the embodiment, the characteristic configuration will be explained.

In the embodiment, the cable 13 connects the plurality of drive parts 31-1 to 31-N and the control unit 11. The control unit 11 controls power for driving the drive parts 31-1 to 31-N by switching.

As an example, the control unit 11 has a module (an inverter in the embodiment) of generating power for driving the plurality of drive parts 31-1 to 31-N using pulse width modulation (PWM). The pulse width modulation is an example of a technique of generating waveforms using switching. The cable 13 transmits the generated power to the plurality of drive parts 31-1 to 31-N. The cable 13 is e.g. a shielded cable.

In the embodiment, the cable 13 has the pluralities of power lines 101, 102, the plurality of FG lines 103, and the shield 111. The cable has a first interposition object (the interposition layer 122, the FG lines 103, the additional lines 104, and air in the embodiment) between the pluralities of power lines 101, 102 and the shield 111. In the section of the cable 13, the respective centers of the plurality of FG lines 103 are closer to the shield 111 than the respective centers of the pluralities of power lines 101, 102.

Here, the cable 13 has a plurality of core lines. The plurality of core lines are bundled.

The plurality of core lines include at least the power lines 101, 102.

The plurality of core lines include at least the FG lines 103.

In the embodiment, the cable has a second interposition object (the interposition layer 122 in the embodiment) between the pluralities of power lines 101, 102 and the plurality of FG lines 103.

According to the configuration, for example, the region of the power lines 101, 102 and the region of the FG lines 103 may be separated, and thereby, capacitance between the power lines 101, 102 and the region of the FG lines 103 can be reduced.

As a configuration example, the coating of the power lines 101, 102 and the coating of the FG lines 103 are not in contact.

In the embodiment, at least one of the first interposition object and the second interposition object is an insulator.

In the embodiment, the power lines 101, 102 include conductor wires and insulators.

In the embodiment, the FG lines 103 include conductor wires and insulators. The thickness of the insulators of the FG lines 103 is thinner than the thickness of the insulators of the power lines 101, 102.

According to the configuration, for example, the interposition layer 122 may be made thicker without increase in the outer diameter of the cable 13.

In the embodiment, the insulators (e.g. the first interposition object, the second interposition object, the insulators of the power lines 101, 102, or the insulators of the FG lines 103, or the like) are at least one of air, paper, cotton, or plastic. As the plastic, various plastics e.g. polyethylene or polypropylene may be used.

Here, the insulators may be selected in consideration of the cost or hardness, for example. As an example, polyethylene is generally used as an insulating material for cable coating, and has lower relative permittivity and lower cost.

In the embodiment, at least one of the first interposition object and the second interposition object is another wire rod than the power lines 101, 102 and the FG lines 103.

In the embodiment, the pluralities of power lines 101, 102 are bundled. The bundle has a circular shape in the section of the cable 13.

Here, generally, as the bundle is closer to the circular shape, the surface area is smaller, and thereby, stray capacitance (capacitance) between the FG lines 103 and themselves is lower.

In the embodiment, the FG lines 103 are not sandwiched between the respective pluralities of power lines 101, 102.

Here, for example, a configuration in which other lines than the pluralities of power lines 101, 102 are not sandwiched between the pluralities of power lines 101, 102 may be used.

As described above, the surface area of the region in which the pluralities of power lines 101, 102 exist may be made smaller by reduction of the other lines sandwiched between the pluralities of power lines 101, 102 (to zero in the embodiment), and thereby, the capacitance between the pluralities of power lines 101, 102 and the other objects can be reduced.

In the embodiment, the diameter of the FG lines 103 is larger than the diameter of the other wire rods than the FG lines (including the power lines 101, 102, for example).

As described above, according to the configuration in which the diameter of the FG lines 103 is larger than the diameter of the other lines, for example, when the FG lines 103 of the core lines are arranged in the outermost circumference, the outermost layer is thicker and the power lines 101, 102 and the shield 111 can be largely separated.

In the embodiment, the FG lines 103 are arranged at equal intervals.

As described above, according to the configuration in which the respective plurality of FG lines 103 are arranged at equal intervals, the section of the cable 13 can be made closer to the circular shape and, for example, the application of bending stress on the cable 13 is prevented from depending on the bending direction.

In the embodiment, the shield 111 is formed only by a conductor braided tube.

According to the configuration, for example, compared to the case where a foil such as an aluminum tape is used, the surface area can be made smaller, and thereby, the capacitance between the pluralities of power lines 101, 102 and the shield 111 can be reduced. Compared to the case where a foil such as an aluminum tape is used, in the case where the braid is used, hollow cavities are formed and the relative permittivity is lower. It is desirable that the hollow cavities are rough in view of the reduction of the relative permittivity.

As a configuration example, the plurality of FG lines 103 are arranged in a cordel structure with respect to the other core lines than the FG lines 103. Thereby, for example, the section of the cable 13 is closer to the circular shape and the application of bending stress on the cable 13 is prevented from depending on the bending direction.

Note that, as the cordel structure, a generally known structure may be used, and thereby, in the cable 13, a condition close to air insulation can be obtained.

Here, the power lines 101, 102 are separated from the shield 111.

The FG lines 103 are close to the shield 111. In the embodiment, the FG lines 103 are in contact with the shield 111.

The FG lines 103, the shield 111, and the drain wire 112 are at the potential of the FG.

For example, the surface areas of the power lines 101, 102 and the FG lines 103 are reduced, and thereby, the capacitance between the power lines 101, 102 and the FG lines 103 may be preferably reduced.

Explanation of Physical Properties

Figure 4:
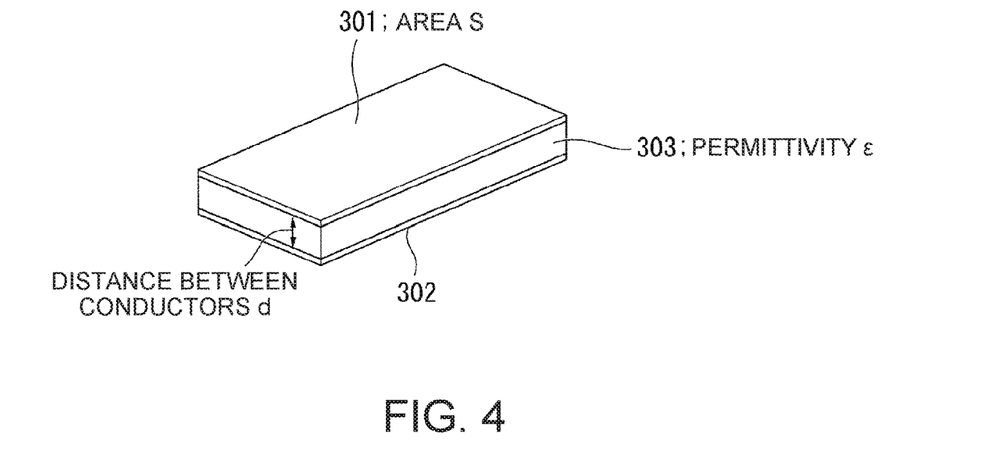
FIG. 4 is a diagram for explanation of capacitance between conductors.
Figure 5:
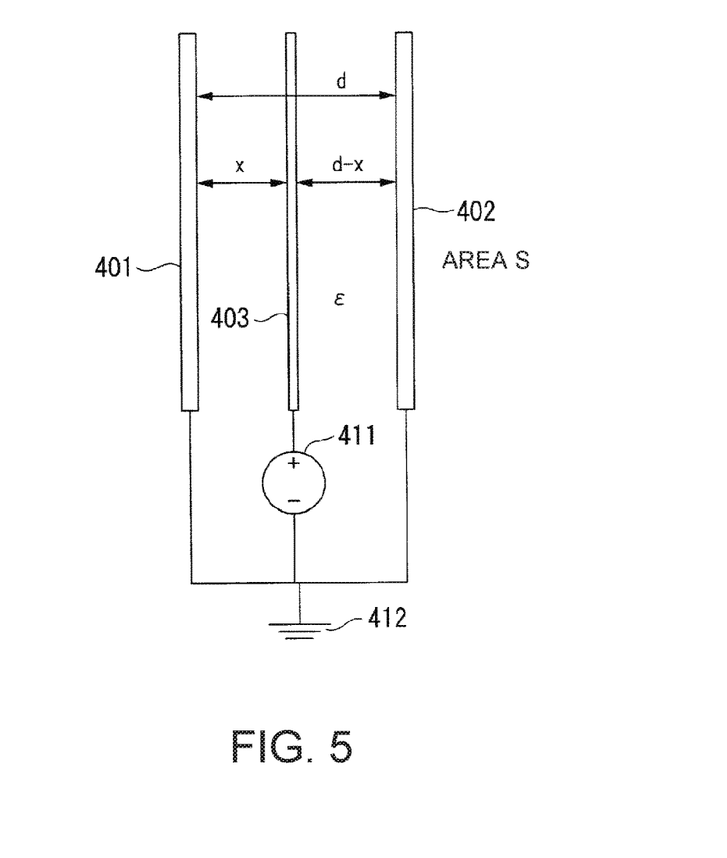
FIG. 5 is a diagram for explanation of a relationship between arrangement of a power line and a shield and capacitance.
Figure 6:
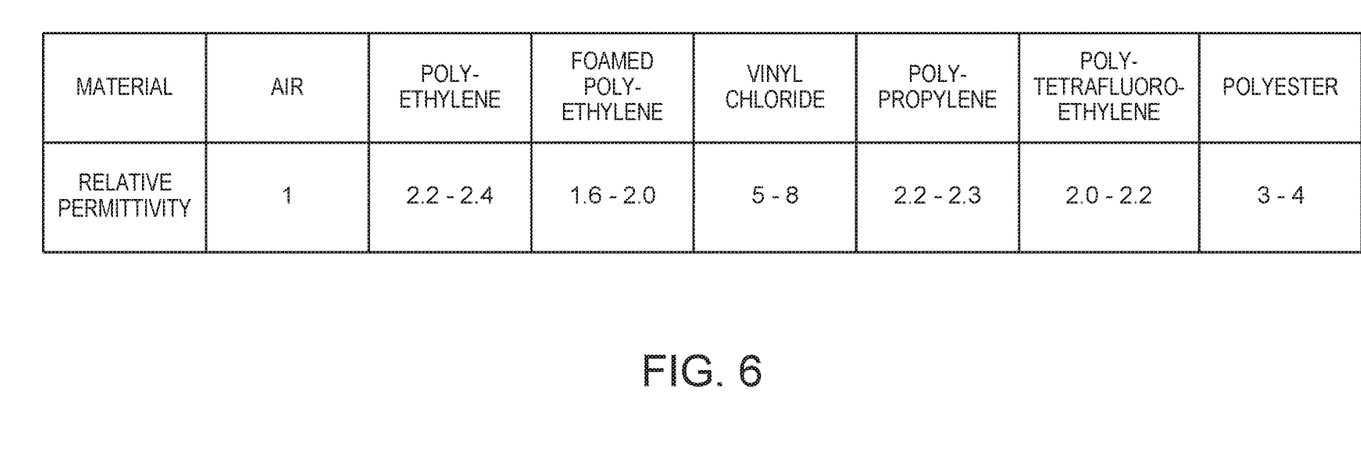
FIG. 6 shows correspondences between materials and relative permittivity.

Referring to FIGS. 4 to 6, physical properties are explained. The properties may be considered when the cable of the robot system 1 according to the embodiment is designed.

FIG. 4 is a diagram for explanation of capacitance between conductors.

FIG. 4 shows a first electrode plate 301 as a conductor, a second electrode plate 302 as a conductor, and a dielectric 303 existing between the first electrode plate 301 and the second electrode plate 302. The first electrode plate 301 and the second electrode plate 302 have the same surface shape with each other and the surfaces having the same shape are opposed at a fixed distance. The dielectric 303 has the same shape as the shape of the space between the first electrode plate 301 and the second electrode plate 302 and buries the space between the first electrode plate 301 and the second electrode plate 302.

Suppose that the area of the surface of the first electrode plate 301 and the area of the surface of the second electrode plate 302 are S (S is a value larger than zero), the distance between the first electrode plate 301 and the second electrode plate 302 (the distance between the conductors) is d (d is a value larger than zero), and the permittivity of the dielectric 303 is $\in$ ($\in$ is a value larger than zero). In this case, capacitance C (C is a value larger than zero) is expressed by the equation (1).

$$C = \in \cdot S / d \quad (1)$$

As described above, the capacitance C between the conductors is determined primarily by the three factors of the distance d between the conductors, the surface area S of the conductors, and the permittivity $\in$ of the dielectric (insulator) intervening between the conductors. To reduce the capacitance C between the conductors, the distance d between the conductors may be increased, the surface area S of the conductors may be reduced, and the permittivity $\in$ may be reduced.

FIG. 5 is a diagram for explanation of a relationship between arrangement of a power line (the power lines 101, 102 in the example of FIG. 2) and a shield (the shield 111 in the example of FIG. 2) and capacitance. FIG. 5 shows a modeled section of the cable in the longitudinal direction (a section perpendicular to the section shown in FIG. 2 or 3).

FIG. 5 shows shields 401, 402, a power line 403, a power supply 411, and a ground terminal 412.

The arrangement of the shields 401, 402 is the same as the arrangement of the first electrode plate 301 and the second electrode plate 302 shown in FIG. 4. The areas of the surface of the shield 401 and the surface of the shield 402 are S. The distance between the surface of the shield 401 and the surface of the shield 402 is d. The permittivity of the dielectric between the surface of the shield 401 and the surface of the shield 402 is $\in$.

The power line 403 as a conductor exists between the surface of the shield 401 and the surface of the shield 402. The power line 403 has the same surface shape as the shield 401 and the shield 402. Regarding the shields 401, 402 and the power line 403, the surfaces having the same shape are opposed at predetermined distances.

The shields 401, 402 are connected to the ground terminal 412 and the power line 403 is connected to the ground terminal 412 via the power supply 411. The ground terminal 412 is grounded.

Suppose that the distance between the surface of the shield 401 and the surface of the power line 403 (the distance between the conductors) is x (x is a value larger than zero and smaller than d) and the distance between the surface of the shield 402 and the surface of the power line 403 (the distance between the conductors) is (d−x). In this case, total capacitance Ca (Ca is a value larger than zero) is expressed by the equation (2).

$$\begin{aligned} Ca &= \varepsilon \cdot S / x + \varepsilon \cdot S / (d - x) \\ &= \varepsilon \cdot S \cdot d / \{x \cdot (d - x)\} \\ &= \varepsilon \cdot S \cdot d / \{-(x - d/2)^2 + d^2/4\} \end{aligned} \quad (2)$$

Here, from the equation (2), for x=d/2, the total capacitance Ca is the minimum. That is, to minimize the total capacitance Ca, the distances between the shields 401, 402 and the power line 403 are made equal. When the power line takes a form of a bundle, the distances between the outer circumference of the bundle of the power line and the shields are made equal, and thereby, the total capacitance may be minimized.

As described above, in the example of FIG. 2 according to the embodiment, for example, it is considered that the capacitance may be made smaller by arrangement of the regions in which the power lines 101 exist to separate as equally as possible from the regions in which the FG lines 103 exist. Similarly, for example, it is considered that the capacitance may be made smaller by arrangement of the regions in which the power lines 102 exist to separate as equally as possible from the regions in which the FG lines 103 exist. Note that the power lines 101 and the power lines 102 have different thicknesses and different surface areas from each other, and are individually described here.

FIG. 6 shows correspondences between materials and relative permittivity.

Specifically, relative permittivity of air is "1", relative permittivity of polyethylene is from 2.2 to 2.4, relative permittivity of foamed polyethylene is from 1.6 to 2.0, relative permittivity of vinyl chloride is from 5 to 8, relative permittivity of polypropylene is from 2.2 to 2.3, relative permittivity of polytetrafluoroethylene is from 2.0 to 2.2, and permittivity of polyester is from 3 to 4. The polytetrafluoroethylene is known as Teflon (registered trademark).

Outline of First Embodiment

As described above, in the robot system 1 according to the embodiment, in the cable 13, the conductive noise current may be reduced (reduced compared to the case where the configuration of the embodiment is not employed). Thereby, for example, noise from the cable 13 as a power supply line to the outside may be suppressed. For example, the conductive noise generated by switching may be reduced and downsizing or reduction of anti-noise components may be realized. For example, reduction of power loss generated by switching may be realized, and thereby, reduction of power consumption or reduction of heat generation may be realized.

As a specific example, in the embodiment, in the cable 13 used for driving a plurality of motors, capacitance between core lines (power lines 101, 102) for transmitting electric power to provide motive power to the motors and the conductors at the FG potential (FG lines 103, shield 111) may be reduced. In the robot system 1 according to the embodiment, the cable 13 is used, and thereby, conductive noise generated when the plurality of motors are driven (particularly, conductive common-mode noise) may be reduced.

Further, in the robot system 1 according to the embodiment, for example, when another cable for signal communication or the like is provided in addition to the cable 13 for driving, capacitance between the power lines 101, 102 contained in the cable 13 for driving and the other cable can be reduced.

Second Embodiment

Outline of Robot System

The schematic configuration example of the robot system according to the embodiment is the same as the schematic configuration example of the robot system 1 according to the first embodiment shown in FIG. 1. In the embodiment, compared to the robot system 1 according to the first embodiment, the configuration of the cable is different and the configurations of the control unit and the robot are the same.

Accordingly, as below, the control unit 11, the robot 12, the switching circuits 21-1 to 21-N, and the drive parts 31-1 to 31-N will be explained with the same signs as those of the first embodiment. Further, the robot system and the cable will be explained with the signs of the robot system 2 and the cable 51.

Further, as below, the parts different from those of the first embodiment will be explained in detail and the explanation of the same parts with those of the first embodiment will be omitted or simplified.

Explanation of Cable

Figure 3:
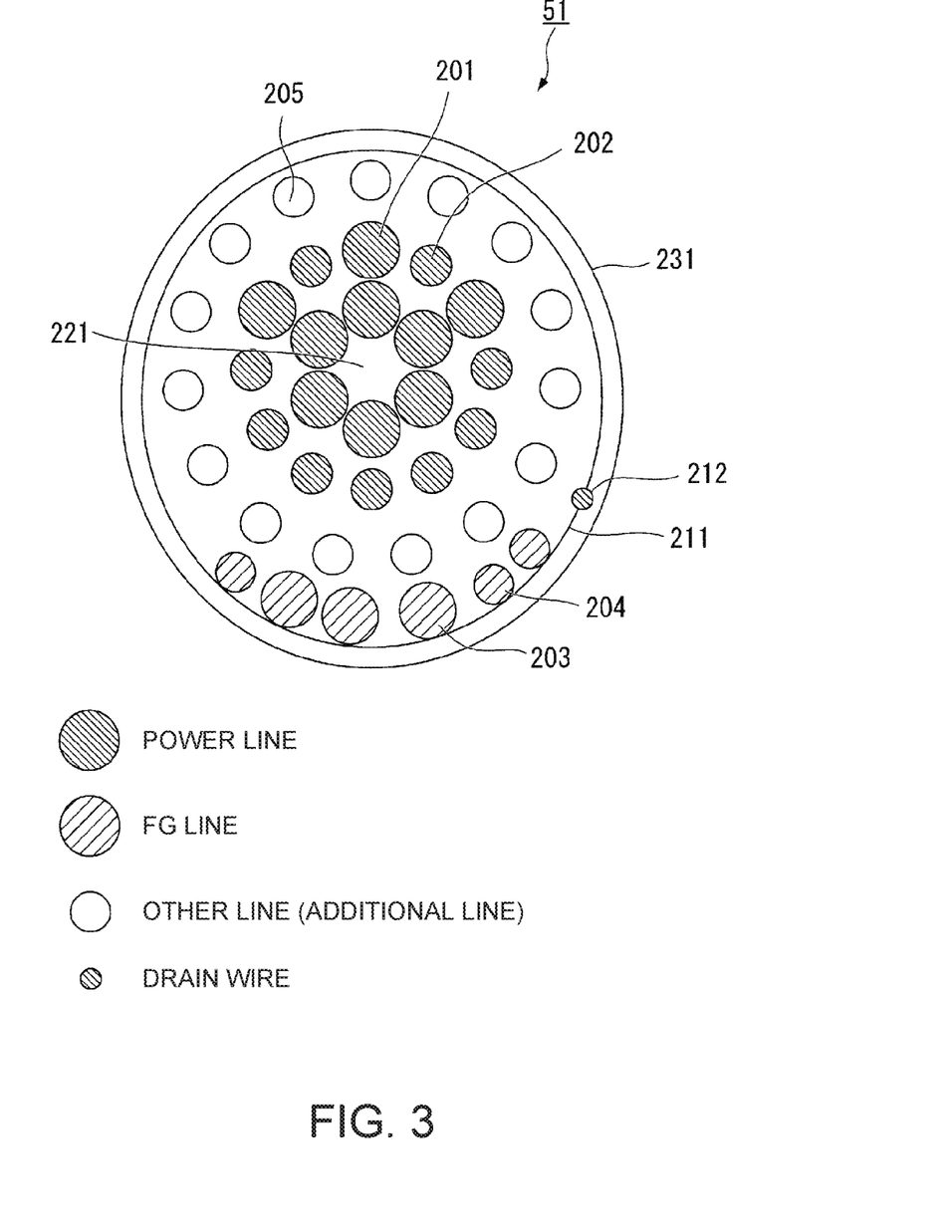
FIG. 3 shows a schematic configuration example of a cable according to one embodiment (the second embodiment) of the invention.

FIG. 3 shows a schematic configuration example of the cable 51 according to one embodiment (the second embodiment) of the invention.

FIG. 3 shows a configuration example of a section of the cable 51. The section is a section perpendicular to the center line of the cable 51.

The section of the cable 51 has an oval shape.

The outside of the cable 51 is covered by a sheath 231. The sheath 231 is formed using e.g. rubber or vinyl chloride.

Inside of the cable 51, a plurality of thick power lines 201, a plurality of thin power lines 202, a plurality of thick FG lines 203, a plurality of thin FG lines 204, a plurality of other lines (hereinafter, referred to as "additional lines" for convenience of explanation) 205, a shield 211, a drain wire (drain line) 212, and an inclusion 221 are provided.

Note that, in FIG. 3, signs show only one of each of the thick power lines 201, the thin power lines 202, the thick FG lines 203, the thin FG lines 204, and the additional lines 205.

In the embodiment, there are nine thick power lines 201 and nine thin power lines 202. The switching circuits 21-1 to 21-N and the drive parts 31-1 to 31-N are connected with respect to each combination using three thick power lines 201 or three thin power lines 202. In the embodiment, of the six drive parts 31-1 to 31-N (N=6), the thick power lines 201 are used for the three axes at the root of the manipulator forming the robot 12 and the thin power lines 202 are used for the three axes at the end of the manipulator. The thick power lines 201 can transmit higher power (e.g. higher current or higher voltage) than the thin power lines 202. In the embodiment, operation of a three-phase motor is performed by three power lines (U, V, W).

In the embodiment, there are three thick FG lines 203 and three thin FG lines 204. In the embodiment, of the six drive parts 31-1 to 31-N (N=6), the thick FG lines 203 are used for the three axes at the root of the manipulator forming the robot 12 and the thin FG lines 204 are used for the three axes at the end of the manipulator. Each of the FG lines 203, 204 is connected to a chassis of each of the drive parts 31-1 to 31-N (a chassis of each motor in the embodiment), and a chassis of the robot 12. Further, the FG lines 203, 204 are connected to the ground at the sides of the switching circuits 21-1 to 21-N.

As another configuration example, a configuration in which the FG lines 203, 204 are connected to the ground at the sides of the drive parts 31-1 to 31-N in place of the sides of the switching circuits 21-1 to 21-N may be used.

In the embodiment, there are fifteen additional lines 205. In the embodiment, two or three additional lines 205 are used for each of the six drive parts 31-1 to 31-N (N=6).

The additional lines 205 may be various lines. For example, lines for transmitting predetermined currents or dummy lines may be used.

As described above, in the embodiment, three power lines (three thick power lines 201 or three thin power lines 202), one FG line (one thick FG line 203 or one thin FG line 204), and the two or three additional lines 205 are used for connection of each of the combinations of the switching circuits 21-1 to 21-N and the drive parts 31-1 to 31-N. The configuration is an example, and another configuration may be used.

In the section of the cable 51, an inclusion 221 is provided in a position slightly apart from the center part of the oval shape. The six thick power lines 201 are symmetrically arranged around the inclusion. The three thick power lines 201 are arranged and the nine thin power lines 202 are arranged around the six thick power lines. The fifteen additional lines 205 are symmetrically arranged around the power lines. The three thick FG lines 203 and the three thin FG lines 204 are arranged on an arc (or nearly on an arc) of about one-quarter of the circumference. The oval cylindrical shield 211 (having an oval section) is provided around the lines. The oval cylindrical sheath 231 (having an oval section) is provided around the shield. The drain wire 212 is provided in the shield 211.

Here, the inclusion 221 nearly at the center has a role of arranging the shape of the cable 51.

Further, inside of the sheath 231, air exists in parts without the inclusion 221, the power lines 201, 202, the FG lines 203, 204, the additional lines 205, the shield 211, and the drain wire 212. As another configuration example, another material than air may be provided in a part or all of the parts in which the air exists.

In parts in which the three thick power lines 201 and the nine thin power lines 202 are arranged around the six thick power lines 201, the nine thin power lines 202 can be separated from the shield 211 compared to the three thick power lines 201.

Regarding the cable 51 according to the embodiment, the characteristic configuration will be explained.

In the embodiment, the cable 51 connects the plurality of drive parts 31-1 to 31-N and the control unit 11. The control unit 11 controls power for driving the drive parts 31-1 to 31-N by switching.

As an example, the control unit 11 has a module (an inverter in the embodiment) of generating power for driving the plurality of drive parts 31-1 to 31-N using pulse width modulation (PWM). The pulse width modulation is an example of a technique of generating waveforms using switching. The cable 51 transmits the generated power to the plurality of drive parts 31-1 to 31-N. The cable 51 is e.g. a shielded cable.

In the embodiment, the cable 51 has the pluralities of power lines 201, 202, the pluralities of FG lines 203, 204, and the shield 211. The cable has a first interposition object (the FG lines 203, 204, the additional lines 205, and air in the embodiment) between the pluralities of power lines 201, 202 and the shield 211. In the section of the cable 51, the respective centers of the pluralities of FG lines 203, 204 are closer to the shield 211 than the respective centers of the pluralities of power lines 201, 202.

Here, the cable 51 has a plurality of core lines. The plurality of core lines are bundled.

The plurality of core lines include at least the power lines 201, 202.

The plurality of core lines include at least the FG lines 203, 204.

In the embodiment, the cable has a second interposition object (the additional lines 205 and air in the embodiment) between the pluralities of power lines 201, 202 and the pluralities of FG lines 203, 204.

According to the configuration, for example, a distance between the region of the power lines 201, 202 and the region of the FG lines 203, 204 may be separated, and thereby, capacitance between the power lines 201, 202 and the FG lines 203, 204 can be reduced.

As a configuration example, the coating of the power lines 201, 202 and the coating of the FG lines 203, 204 are not in contact.

In the embodiment, at least one of the first interposition object and the second interposition object is an insulator.

In the embodiment, the power lines 201, 202 include conductor wires and insulators.

In the embodiment, the FG lines 203, 204 include conductor wires and insulators. The thickness of the insulators of the FG lines 203, 204 is thinner than the thickness of the insulators of the power lines 201, 202.

In the embodiment, the insulators (e.g. the first interposition object, the second interposition object, the insulators of the power lines 201, 202, the insulators of the FG lines 203, 204, or the like) are at least one of air, paper, cotton, or plastic. As the plastic, various plastics, e.g., polyethylene or polypropylene may be used.

Here, the insulators may be selected in consideration of the cost or hardness, for example. As an example, polyethylene is generally used as an insulating material for cable coating, and has lower relative permittivity and lower cost.

In the embodiment, at least one of the first interposition object and the second interposition object is another wire rod than the power lines 201, 202 and the FG lines 203, 204.

In the embodiment, the pluralities of power lines 201, 202 are bundled. The bundle has a circular shape in the section of the cable 51.

Here, generally, as the bundle is closer to the circular shape, the surface area is smaller, and thereby, stray capacitance (capacitance) between the FG lines 203, 204 and themselves is lower.

In the embodiment, the FG lines 203, 204 are not sandwiched between the respective pluralities of power lines 201, 202.

Here, for example, a configuration in which other lines than the pluralities of power lines 201, 202 are not sandwiched between the pluralities of power lines 201, 202 may be used.

As described above, the surface area of the region in which the pluralities of power lines 201, 202 exist may be made smaller by reduction of the other lines sandwiched between the pluralities of power lines 201, 202 (to zero in the embodiment), and thereby, the capacitance between the pluralities of power lines 201, 202 and the other objects can be reduced.

In the embodiment, the diameter of the thick FG lines 203 is larger than the diameter of the other wire rods than the FG lines (including the power lines 201, 202, for example).

As described above, according to the configuration in which the diameter of the thick FG lines 203 is larger than the diameter of the other lines, for example, when the thick FG lines 203 of the core lines are arranged in a part of the outermost circumference, the part of the outermost layer is thicker and the power lines 201, 202 and the shield 211 can be largely separated in the part.

Note that, in the embodiment, in a circumference of the section of the cable 51, the FG lines 203, 204 are arranged collectively in a part of the circumference, not at equal intervals as the entire circumference.

In the embodiment, the shield 211 is formed only by a conductor braided tube.

According to the configuration, for example, compared to the case where a foil such as an aluminum tape is used, the surface area can be made smaller. Compared to the case where a foil such as an aluminum tape is used, in the case where the braid is used, hollow cavities are formed and the relative permittivity is lower. It is desirable that the hollow cavities are rough in view of the reduction of the relative permittivity.

Here, the power lines 201, 202 are separated from the shield 211.

The FG lines 203, 204 are close to the shield 211. In the embodiment, the FG lines 203, 204 are in contact with the shield 211.

The FG lines 203, 204, the shield 211, and the drain wire 212 are at the potential of the FG.

For example, the surface areas of the power lines 201, 202 and the FG lines 203, 204 are reduced, and thereby, the capacitance between the power lines 201, 202 and the FG lines 203, 204 may be preferably reduced.

Outline of Second Embodiment

As described above, in the robot system 2 according to the embodiment, in the cable 51, the conductive noise current may be reduced (reduced compared to the case where the configuration of the embodiment is not employed). Thereby, for example, noise from the cable 51 as a power supply line to the outside may be suppressed. For example, the conductive noise generated by switching may be reduced and downsizing or reduction of anti-noise components may be realized. For example, reduction of power loss generated by switching may be realized, and thereby, reduction of power consumption or reduction of heat generation may be realized.

As a specific example, in the embodiment, in the cable 51 used for driving a plurality of motors, capacitance between core lines (power lines 201, 202) for transmitting electric power to provide motive power to the motors and the conductors at the FG potential (FG lines 203, 204, shield 211) may be reduced. In the robot system 2 according to the embodiment, the cable 51 is used, and thereby, conductive noise generated when the plurality of motors are driven (particularly, conductive common-mode noise) may be reduced.

Further, in the robot system 2 according to the embodiment, for example, when another cable for signal communication or the like is provided in addition to the cable 51 for driving, capacitance between the power lines 201, 202 contained in the cable 51 for driving and the other cable can be reduced.

Outline of Embodiments

As above, the embodiments of the invention are described in detail with reference to the drawings, however, the specific configurations are not limited to the embodiments and include designs etc. without departing from the scope of the invention.

The entire disclosure of Japanese Patent Application No. 2015-142718, filed Jul. 17, 2015 is expressly incorporated by reference herein.

What is claimed is:

1. A robot system comprising:
    a plurality of drive parts;
    a control unit that controls power for driving the drive parts by switching; and
    a cable that connects the drive parts and the control unit, wherein the cable has a plurality of power lines, a plurality of frame ground lines, a shield enclosing the plurality of power lines and the plurality of frame ground lines, and a sheath enclosing the shield,
    a first interposition object is provided between the plurality of power lines and the shield, the first interposition object being disposed between the plurality of power lines and the plurality of frame ground lines,
    in a section of the cable, respective centers of the plurality of frame ground lines are closer to the shield than respective centers of the plurality of power lines,
    each of the plurality of power lines includes a conductor wire and an insulator,
    each of the plurality of frame ground lines includes a conductor wire and an insulator, and
    a thickness of the insulator of each of the plurality of frame ground lines is thinner than a thickness of the insulator of each of the plurality of power lines.

2. The robot system according to claim 1, wherein a second interposition object is provided between the plurality of power lines and the plurality of frame ground lines.

3. The robot system according to claim 2, wherein at least one of the first interposition object and the second interposition object is an insulator.

4. The robot system according to claim 3, wherein the insulator is at least one of air, cotton, or plastic.

5. The robot system according to claim 2, wherein at least one of the first interposition object and the second interposition object is another wire rod than the power lines and the frame ground lines.

6. The robot system according to claim 1, wherein the plurality of power lines take a form of a bundle, and the bundle has a circular shape in the section of the cable.

7. The robot system according to claim 1, wherein the frame ground lines are not sandwiched between the respective plurality of power lines.

8. The robot system according to claim 1, wherein a diameter of the frame ground line is thicker than a diameter of another wire rod than the frame ground line.

9. The robot system according to claim 1, wherein the frame ground lines are arranged at equal intervals.

10. The robot system according to claim 1, wherein the shield is formed only by a conductor braided tube.

11. A cable comprising:
    a plurality of power lines;
    a plurality of frame ground lines;
    a shield enclosing the plurality of power lines and the plurality of frame ground lines;
    a sheath enclosing the shield; and
    a first interposition object between the plurality of power lines and the shield, the first interposition object being disposed between the plurality of power lines and the plurality of frame ground lines,
    wherein, in a section of the cable, respective centers of the plurality of frame ground lines are closer to the shield than respective centers of the plurality of power lines,
    each of the plurality of power lines includes a conductor wire and an insulator,
    each of the plurality of frame ground lines includes a conductor wire and an insulator, and
    a thickness of the insulator of each of the plurality of frame ground lines is thinner than a thickness of the insulator of each of the plurality of power lines.

* * * * *